United States Patent [19]
Hendren et al.

[11] Patent Number: 5,320,892
[45] Date of Patent: Jun. 14, 1994

[54] TOUGH LAYERED PAPERS WITH IMPROVED SURFACE ADHESION

[75] Inventors: Gary L. Hendren; Lee J. Hesler, both of Richmond, Va.

[73] Assignee: E. I. Du Pont de Nemours and Company, Wilmington, Del.

[21] Appl. No.: 16,949

[22] Filed: Feb. 22, 1993

[51] Int. Cl.⁵ .............................................. B32B 3/12
[52] U.S. Cl. ........................................ 428/116; 52/806; 162/157.3; 428/395; 428/902
[58] Field of Search ............... 428/116, 73, 117, 118, 428/395, 902; 52/806; 162/157.3; 493/966

[56] References Cited

U.S. PATENT DOCUMENTS

| | | | |
|---|---|---|---|
| H47 | 4/1986 | Monib | 428/116 |
| 2,999,788 | 9/1961 | Morgan | 162/146 |
| 3,756,908 | 9/1973 | Gross | 162/146 |
| 4,710,432 | 12/1987 | Nishimura et al. | 428/116 X |
| 4,957,794 | 9/1990 | Bair | 428/74 |
| 5,021,283 | 6/1991 | Takenaka et al. | 428/118 X |
| 5,126,012 | 6/1992 | Hendren et al. | 162/157.3 X |
| 5,137,768 | 8/1992 | Lin | 428/116 |

FOREIGN PATENT DOCUMENTS 61-174497 8/1986 Japan .
4-6708 1/1992 Japan .

*Primary Examiner*—Henry F. Epstein

[57] ABSTRACT

A laminate for honeycomb structures comprised of two outside layers having good surface adhesion and a tough core layer, said core constituting from 50 to 70% by weight of the laminate and containing from about 60 to 80% by weight of poly(m-phenylene isophthalamide) fibrids and each outside layer constituting from 15 to 25% by weight of the laminate and containing about 60 to 70% by weight of floc.

4 Claims, 1 Drawing Sheet

FIGURE
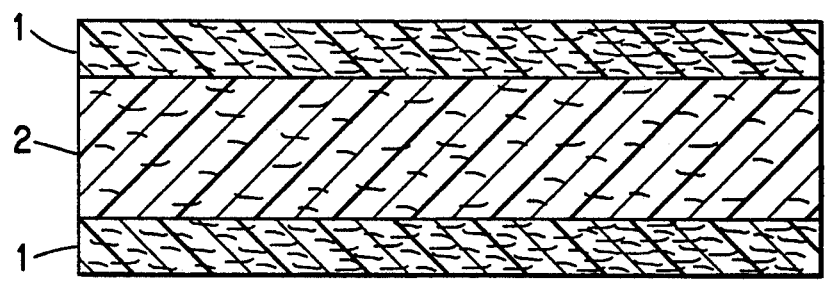

TOUGH LAYERED PAPERS WITH IMPROVED SURFACE ADHESION

BACKGROUND OF THE INVENTION

Structures comprising a honeycomb core impregnated with a matrix resin wherein the core is a nonwoven paper of poly(m-phenylene isophthalamide) (MPD-I) fibrids and poly(p-phenylene terephthalamide) (PPD-T) fibers is taught in Lin U.S. Pat. No. 5,137,768.

As described in the Lin patent, the honeycomb structure is prepared by cutting individual sheets from a roll of paper, applying stripes or node lines of adhesive to the sheets and laying the sheets together. The adhesive is activated to bond the layers along the stripes. The expanded honeycomb structure is formed by pulling the sheets apart to the point where the adhesive prevents further separation. It is then dipped in epoxy or phenolic resin to impregnate the paper. Lin points out that saturation of the paper by matrix resin is important to the honeycomb properties and for this reason, paper containing no more than 50 wt. percent of fibrid is employed. An excess of fibrids seals off the paper so that the striping adhesive does not adhere adequately. It also prevents the matrix resin from penetrating sufficiently to develop the desired honeycomb properties. On the other hand, too little fibrid in the sheet results in a lack of adequate toughness.

BRIEF DESCRIPTION OF THE DRAWING

The FIGURE schematically depicts the laminate of this invention.

SUMMARY OF THE INVENTION

The present invention is a tough laminate with good surface adhesion characteristics comprised of two outside layers and an inner layer, said inner layer constituting from 50 to 70 weight percent of the laminate and containing from about 60 to about 80 weight percent of poly(m-phenylene isophthalamide) fibrids with the remainder poly(m-phenylene isophthalamide), poly(p-phenylene terephthalamide), copoly(p-phenylene/3,4'-diphenyl ether terephthalamide, carbon, or glass floc, and with each outside layer constituting from 15 to 25 weight percent of the laminate and containing from about 60 to 70 weight percent of the floc with the remainder being poly(m-phenylene isophthalamide) fibrids, said layers having been calendered to form a coherent structure having a density of from 0.6 to 0.9 g/cc. Also encompassed is a honeycomb structure formed of the laminate and which has been impregnated with a resin.

DETAILED DESCRIPTION OF THE INVENTION

The laminated sheet of the present invention may be prepared by any of various methods. One method involves layering the paper on a papermaking machine to produce three distinct layers with predetermined fibrid/floc ratios in each layer followed by processing as normally done on a paper machine by pressing and drying. For example, blends of fibers and floc are fed to a 3-layer hydraulic type headbox which maintains separation of layers of ingredient until the slice exit where only limited mixing of the layers occurs. Another method is to ply three single sheets, each of selected fibrid/floc ratios and calendering. Still another procedure is to layer two layers on a papermaking machine (one outside layer and one-half of the core layer) and plying two of these papers in a calendering step. Additionally, one can conceive of various methods to deposit multiple layers on a forming wire and calendering.

For use in honeycomb structures, it is preferred that the laminated sheet have a basis weight of between 1.1 and 3.4 oz/yd$^2$, and a density of from 0.6 to 0.9 g/cc after calendering, depending on thickness.

As disclosed in the Lin patent mentioned above, papers made from fibers and fibrids are known from Gross U.S. Pat. No. 3,756,908, and in other prior art. The core layer or inner layer constitutes from 50 to 70% by weight of the laminated sheet structure of the present invention and contains about 60 to 80% by wt. of MPD-I fibrids with the remainder of said layer being floc. The core layer of the laminate is sandwiched between two outside layers, each constituting from 15 to 25% by weight of the laminate. The outside layers contain from about 60 to 70% by weight of floc with the remainder of said layers being MPD-I fibrids.

In place of MPD-I fibrids and floc one may employ copolymers thereof containing up to 5 mol % of terephthaloyl units based on the mixture with isophthaloyl units. As used herein, MPD-I is intended to include both the homopolymer and such copolymers.

The construction of the laminate as shown in the Figure provides properties of particular value for honeycomb structures. The floc-rich outer layers (1) provide excellent substrates for the striping adhesive and for the impregnating epoxy or phenolic resin. The core layer (2), on the other hand, provides toughness and serves as a barrier to resin penetration while it does not readily absorb the adhesive or resin, it has no need to. Thus each layer of the composite serves a separate function which in the aggregate provides a particularly useful core for honeycomb structure.

TEST PROCEDURES

Surface Strength Test (SSTR Test)

Sample Preparation

Six 8" by 8" squares are cut from each sample and the Machine Direction labeled. A 5 inch long stripe of adhesive (3M DP-100 Epoxy) is made in the Cross Direction of one square—3 inches from one edge. Another (untreated) square is placed directly on top of the glued sample, aligning all four edges and the squares are pressed together at a pressure of 0.18 psi for at least 10 minutes. The bonded squares are cured in an oven at 105° C. for 10–20 minutes. Three one inch wide strips are cut in the Machine Direction from the center portion of the square.

The strength of the specimens is measured in an Instron Tester (Model 1122) using the following conditions:

| Number of Specimens | 9 per sample |
| --- | --- |
| Crosshead Speed | 2.0 inches/min |
| Gage Length | 3.0 inches |

The specimens are inserted in the clamps (Instron Model 2712-004) in a peel test arrangement, pulling on the longer two tails of the specimen. The short tails hang free. The reported measurement is the maximum load point on the load elongation curve. The result is expressed in units of pounds force to the nearest 0.1 pounds. The value reported is the average of the 9 specimens.

The following examples, except for the control, are illustrative of the present invention. They are not intended as limiting.

EXAMPLES

EXAMPLE 1

This example shows the preparation of a nonwoven sheet structure of the present invention using the poly(m-phenylene isophthalamide) fibrids and floc. Three separate handsheets must be produced and combined at the couch step to produce one layered paper sample. The outer ply handsheets containing the desired wt. % of the fibrids and desired wt. % of the floc (see Table 1 below) were prepared from the calculated proportions of a 0.3% solids fibrid slurry and 0.25 inch floc. The handsheet was produced by putting the fibrids and floc and 2400 mls of water into a British Pulp Evaluation Apparatus (Mavis Engineering, Ltd. No. 8233) and dispersing them for 5 minutes. This stock was added to a Noble and Woods handsheet mold and additional water added. The stock solution was agitated 10 times with an agitator plate, then vacuum drained through a 100 mesh screen. The sample was couched between 2 plies (each side) of blotter paper to remove excess moisture. The handsheet was then transferred to blotter paper by slapping the sample and 100 mesh screen onto a table top. Another handsheet, to comprise the inner ply, containing the desired wt. % fibrids and desired wt. % floc was produced in a similar fashion.

All three handsheets, in the proper orientation (outer-/inner/outer plies) were put together and then dried on a handsheet hot plate drier (Noble & Wood Model No. F10). Sample strength was judged to be sufficient to produce on a fourdrinier paper machine.

The sample was pressed on a hot press (Farrel Watson-Stillman, Model No. 9175-MR) at 1000 psi, 535° F. for 1 minute. Sample tensile properties and Surface Strength (SSTR) were measured and are reported below.

TABLE 1

| | Layers 1 & 3 | | Layer 2 | | Total | |
|---|---|---|---|---|---|---|
| Item | Floc/Fibrid | Basis Wt. oz/yd | Floc/Fibrid | Basis Wt. oz/yd$^2$ | Floc/Fibrid | Basis Wt. oz/yd$^2$ |
| Control | 49/51 | 0.40 | 49/51 | 1.10 | 49/51 | 1.90 |
| A | 80/20 | 0.32 | 33.5/66.5 | 1.27 | 49/51 | 1.90 |
| B | 80/20 | 0.48 | 18/82 | 0.95 | 49/51 | 1.90 |
| C | 70/30 | 0.32 | 38.5/61.5 | 1.27 | 49/51 | 1.90 |
| D | 70/30 | 0.48 | 28/72 | 0.95 | 49/51 | 1.90 |

The core layer of the control and Items A, B, C and D constitute 58%, 67%, 50%, 67% and 50% respectively of the laminate.

TABLE 2

| Item | Basis Wt oz/yd$^2$ | Dens. g/cc | Break Str. lb/in. | Elong. % | Modulus kpsi | SSTR lbs |
|---|---|---|---|---|---|---|
| Control | 2.04 | 0.63 | 16.95 | 4.38 | 167.80 | 2.00 |
| A | 2.05 | 0.61 | 14.89 | 3.77 | 99.70 | 2.60 |
| B | 2.11 | 0.67 | 12.61 | 3.21 | 210.90 | 2.70 |
| C | 2.18 | 0.67 | 17.16 | 5.10 | 166.20 | 2.60 |

TABLE 2-continued

| Item | Basis Wt oz/yd$^2$ | Dens. g/cc | Break Str. lb/in. | Elong. % | Modulus kpsi | SSTR lbs |
|---|---|---|---|---|---|---|
| D | 2.13 | 0.66 | 15.70 | 4.49 | 172.10 | 2.80 |

While each of Items A-D provides improved adhesion properties as compared with the control, it was found that Item B had low elongation and break strengths. The relatively low break strength and elongation are attributable to the large proportion of fibrids in the inner layer coupled with the fact that the inner layer is present in an amount approaching the lowest permissible limit.

To prepare a honeycomb structure, the laminates A-D may be striped with adhesive and the sheets layed together. The adhesive is activated by heating and expanded into the honeycomb structure which can be impregnated with an epoxy or phenolic resin by dipping the core structure into the resin bath and curing as described in U.S. Pat. No. 5,137,768.

EXAMPLE 2

The stock was prepared by putting the equivalent of 273 dry lbs of the fibrids with 638 equivalent dry lbs of 0.25 in. floc and 17,000 gallons of water in a tank, and dispersing it for 15 minutes. This stock was pumped to a standard inclined wire paper machine at a rate of 61.89 gallons per min./inch width to form a sheet of 9.28 lbs./3000 ft. ream at 150 feet per min. wire speed. This sheet was dried to a moisture level of ~1%. This paper was used as the outer plies of the laminate.

The inner ply was formed as taught in GROSS (U.S. Pat. No. 3,756,908) using similar fibrids and floc to those used above. The inner ply was 39.59 lbs./3000 ft. ream. The three plies were combined in calendering to form a single paper. Two samples of this paper were produced.

A control paper was formed as taught in U.S. Pat. No. 3,756,908 to a basis weight of ~40 lbs/3000 ft. ream and calendered for comparison.

The properties of these samples is given below:

| | Outer Plies | | Inner Ply | | | |
|---|---|---|---|---|---|---|
| Ident. | Floc/Fibrid | Basis Wt. | Floc/Fibrid | Basis Wt. | Br. Str. (lb/inch) | SSTR (lbs.) |
| Control | Single ply only | | 49/51 | 1.91 | 37.46 | 3.4 |
| E | 70/30 | 0.45 | 28/72 | 1.91 | 59.41 | 3.7 |
| F | 70/30 | 0.45 | 28/72 | 1.91 | 63.30 | 3.6 |

We claim:

1. A tough laminate with good surface adhesion comprising two outer layers and an inner layer, said inner layer constituting from 50 to 70 percent by weight of the laminate and containing from about 60 to 80% by weight of poly(m-phenylene isophthalamide) fibrids with the remainder floc and each outer layer constituting from 15 to 25 percent by weight of the laminate and containing from about 60 to 70% by weight of floc with the remainder being poly(m-phenylene isophthalamide) fibrids.

2. A laminate according to claim 1 wherein the floc is poly(m-phenylene isophthalamide).

3. A laminate according to claim 1 having a density of from 0.6 to 0.9 and a basis weight of from 1.1 to 3.4 oz/yd$^2$.

4. A honeycomb structure formed of the laminate of claim 1 and which has been impregnated with a resin.

* * * * *